United States Patent [19]

Ritter et al.

[11] Patent Number: 4,711,987

[45] Date of Patent: Dec. 8, 1987

[54] HEAT SOURCE CIRCUITRY FOR BIOLOGICAL MATERIAL ANALYSIS

[75] Inventors: G. Thomas Ritter, Palatine; Mitchell Budniak, Skokie, both of Ill.

[73] Assignee: Abbott Laboratories, North Chicago, Ill.

[21] Appl. No.: 707,720

[22] Filed: Mar. 1, 1985

[51] Int. Cl.[4] ........................ H05B 3/00; G01N 25/00

[52] U.S. Cl. .................................... 219/358; 219/388; 436/157

[58] Field of Search ............... 219/354, 358, 501, 388, 219/389; 315/151, 149; 432/11, 34, 51; 436/157, 158, 164, 165

[56] References Cited

U.S. PATENT DOCUMENTS

| | | | |
|---|---|---|---|
| 3,288,044 | 11/1966 | Bramer | 315/149 |
| 3,309,071 | 3/1967 | Federici | 432/34 |
| 3,510,676 | 5/1970 | Pierce, Jr. | 219/501 |
| 3,515,853 | 6/1970 | McAdams | 219/346 |
| 3,529,129 | 9/1970 | Rees | 219/354 |
| 3,557,400 | 1/1971 | Arendt et al. | 432/34 |
| 3,721,501 | 3/1973 | Atkinson et al. | 436/164 |
| 3,742,190 | 6/1973 | Giani et al. | 219/389 |
| 3,748,089 | 7/1973 | Boyer et al. | 432/52 |
| 3,809,951 | 5/1974 | Vital et al. | 315/149 |
| 3,896,337 | 7/1975 | Decker | 315/149 |
| 4,092,113 | 5/1978 | Hardy | 436/177 |
| 4,104,025 | 8/1978 | Retzer | 436/164 |
| 4,240,008 | 12/1980 | Numata | 315/151 |
| 4,374,345 | 2/1983 | Takayama | 315/151 |
| 4,382,211 | 5/1983 | Takematsu | 315/151 |
| 4,423,312 | 12/1983 | Wiedenfeld et al. | 219/354 |
| 4,479,720 | 10/1984 | Mochida et al. | 436/177 |
| 4,571,173 | 2/1986 | Chang et al. | 432/11 |
| 4,632,908 | 12/1986 | Schultz | 219/354 |
| 4,636,360 | 1/1987 | Sakurada et al. | 436/164 |

FOREIGN PATENT DOCUMENTS

| | | | |
|---|---|---|---|
| 2720961 | 11/1978 | Fed. Rep. of Germany | 219/346 |
| 2308868 | 11/1976 | France | 432/51 |

*Primary Examiner*—A. D. Pellinen
*Assistant Examiner*—Geoffrey S. Evans
*Attorney, Agent, or Firm*—Martin L. Katz; Donald L. Corneglio

[57] ABSTRACT

An apparatus for heating samples of biological material contained individually on a plurality of fixtures contained on a centrifuge. A flash tube is located adjacent to the centrifuge to convert electrical energy from a capacitor into heat as the samples of biological material go past the flash tube. A trigger signal is used to cause the capacitor to discharge as the biological material moves past the flash tube. Circuitry is used to control the amount the capacitor is charged by using a fixed number of pulses having a controlled amplitude and to prevent charging of the capacitor when the capacitor is discharged. This causes the flash tube to accurately heat the samples of biological material to a predetermined temperature prior to analysis.

18 Claims, 3 Drawing Figures

HEAT SOURCE CIRCUITRY FOR BIOLOGICAL MATERIAL ANALYSIS

BACKGROUND OF THE INVENTION

This invention relates to circuitry used to operate an ionizable gas-filled device commonly known as a flash tube. Such circuitry provides operating parameters which enable a flash tube to be used as a heat source in applications which demand substantial accuracy and reproducibility.

One such application for circuitry of the type described involves analysis of a biological material such as blood serum. Though such an analysis can be accomplished through various techniques, one technique involves the use of a centrifuge characterized by a rotatable surface having a plurality of fixtures mounted about the periphery. A container, holding a blood serum sample and an appropriate reagent, is typically mounted on one of the fixtures so that, upon operation of the centrifuge, a constituent component of the material in the container is isolated for subsequent analysis. This technique is generally described in U.S. Pat. No. 4,632,908, the disclosure therein being incorporated herein by reference.

Analysis of the isolated constituent component of a sample of biological material is preferably conducted under carefully controlled conditions. Thus, immediately prior to analysis it is preferred that each sample of material to be analyzed be at substantially the same temperature. This presents a relatively difficult problem because these samples are not necessarily at the same temperature when they are mounted on the centrifuge. Moreover, material samples are often mounted on the centrifuge at different times, whereby those samples which have been mounted earlier in time have necessarily been subject to different temperature gradients than subsequently mounted samples.

Time is also of the essence in completing the analysis of these material samples. Thus, it would be highly advantageous if the proper conditions for conducting the analysis, including establishing the proper temperature conditions, could be achieved within a very short time, typically about two minutes. This goal is especially difficult to achieve when samples of different temperatures are being rotated in a centrifuge at the relatively rapid rate of about one revolution every 30 milliseconds.

One method for accomplishing this task is by using a flash tube, positioned adjacent the periphery of the centrifuge, as a heat source. The flash tube, operating under the control of a microprocessor, can be made to provide bursts of radiant energy, i.e., heat, to selected samples of material to be analyzed as they rotate past the tube. Though this concept has been generally disclosed in the above-mentioned U.S. Pat. No. 4,632,908, the desire to operate the flash tube to achieve optimum results warranted further effort and investigation.

It is thus an object of the present invention to provide improved circuitry for operating a flash tube under conditions which would make it especially useful as a heat source to selectively heat various samples of material to be analyzed as such samples are rotated past the flash tube at a relatively rapid rate.

It is another object of this invention to provide an improved method for applying predetermined amounts of heat at predetermined times to various samples of biological materials under analysis.

It is a further object of this invention to provide improved instrumentation for conducting an analysis of biological material utilizing a centrifuge having a rotatable surface, a plurality of fixtures disposed about the periphery of the surface, a container mounted to at least one of the fixtures holding the material to be analyzed, computer means monitoring the rotation of the centrifuge for producing a position signal when the selected fixture is in a predetermined position, and circuitry, including a flash tube, for heating the material as it is rotated on the centrifuge.

Other objects, features and advantages of this invention will be apparent upon reading the detailed description of the invention summarized below.

SUMMARY OF THE INVENTION

The various objects, features and advantages of the invention are accomplished in circuitry for providing stored electrical energy to a heat source for a limited time duration, the heat source being adapted to generate a quantity of heat upon receipt of such stored electrical energy, and to apply that heat to a material to be analyzed. The circuitry includes a power supply producing an electrical output, energy control and storage means coupled between the heat source and the power supply, and triggering means coupled to the heat source. The energy control and storage means are adapted to convert the electrical output from the power supply into stored electrical energy for subsequent application to the heat source. The triggering means causes the stored electrical energy to be applied to the heat source so that the heat source converts the stored electrical energy into the desired amount of heat for the desired time duration.

In another aspect of the invention, there is disclosed a method for applying a desired amount of heat at predetermined times to a sample of biological material under analysis. The method includes the steps of mounting a sample of the material at the periphery of the centrifuge, mounting a flash tube adjacent the periphery of the centrifuge, storing charge applicable to the flash tube, causing the release therefrom of heat upon application of a triggering signal to the flash tube, developing a positioning signal when the sample is rotated on the centrifuge to a position adjacent the flash tube, and applying a triggering signal to the flash tube upon development of the positioning signal.

BRIEF DESCRIPTION OF THE DRAWINGS

An exemplary embodiment of the invention summarized above is illustrated in the accompanying drawings wherein.

DETAILED DESCRIPTION OF AN EXEMPLARY EMBODIMENT OF THE INVENTION

Figure 1:
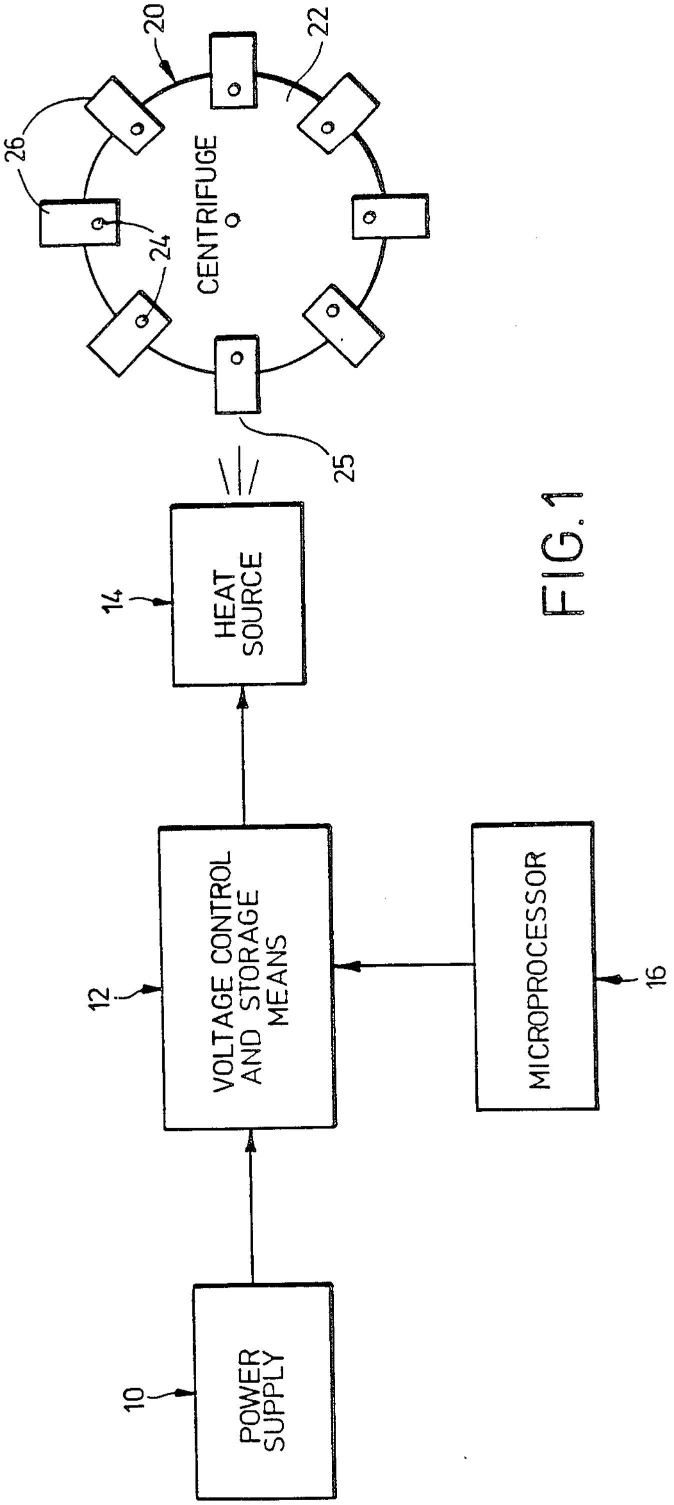
FIG. 1 is a simplified block diagram representing the various elements used for conducting an analysis of biological material incorporating the present invention.

Referring now to FIG. 1, there is shown a block-diagram representing an exemplary embodiment of the elements incorporating the present invention. In particular, a power supply, represented by block 10, receives the usual 120 volt or 240 volt AC voltage which is rectified, filtered, and doubled, if necessary, in a conventional manner to produce an electrical output of approximately 300 volts DC. Power supply 10 may also produce DC reference voltages as may be required by the circuitry described herein, and may also be characterized by a high voltage return.

The electrical output produced by power supply 10 is passed to energy control and storage means characterized by block 12. Energy control and storage means 12 converts the electrical output passed from power supply 10 into a stored electrical energy which is applied to a heat source 14 upon receipt thereby of a triggering signal also passed from energy control and storage means 12. More particularly, energy control and storage means 12 operates under the control of a microprocessor, depicted by block 16, to develop a triggering signal which is then applied to the heat source 14. Upon application of the triggering signal, the stored electrical energy is applied to heat source 14, causing the heat source to generate heat energy corresponding to the magnitude of the stored voltage.

Heat source 14 is located adjacent a centrifuge represented in schematic form by the element identified by reference numeral 20. Centrifuge 20 is characterized by a rotatable surface 22 which carries a plurality of fixtures 24 to which a corresponding plurality of containers 26 may be individually mounted. Containers 26 typically hold a sample of a biological material to be analyzed. For example, each of containers 26 may hold different samples of blood serum, contacted by different reagents, for the purpose of isolating different constituent components of the samples.

Centrifuge 20 is operated by means (not shown) which cause surface 22 to rotate at a relatively rapid rate, typically one revolution every 30 milliseconds. Sensing means (not shown) associated with centrifuge 20 typically cause a positioning signal to be passed to microprocessor 16 whenever a selected container mounted on surface 22 of centrifuge 20 reaches a position 25 which is preferably adjacent to, and in facing relationship with, heat source 14. This positioning signal causes energy control and storage means 12 to apply the triggering signal to heat source 14 which, in turn, allows heat source 14 to convert the stored electrical energy into heat. Because this heat is generated upon the development of the positioning signal, indicative of the fact that the selected container is at position 25, that particular container receives the heat so generated. As a result, the material held in that container is selectively heated by heat source 14, the material in each of the other containers not being so heated.

Depending upon the information received from microprocessor 16, heat source 14 may generate heat each time a container 26 is rotated into the position 25 facing heat source 14, whereby the material in each of containers 26 may be heated to the predetermined temperature desired for analysis. Moreover, depending upon the manner in which microprocessor 16 is programmed, heat source 14 may desirably apply heat to any number of the containers 26 as they are rotated by centrifuge 20. Temperature sensors (not shown) associated with centrifuge 20 may be advantageously employed to provide temperature feedback to microprocessor 16. Such feedback may serve to prevent the generation of the triggering signal after a particular container reaches the position 25 in order to prevent the sample held therein from being overheated. In this manner the material held in any of containers 26 is rapidly raised to, and maintained at, the desired temperature for conducting the necessary analysis.

Figure 2:
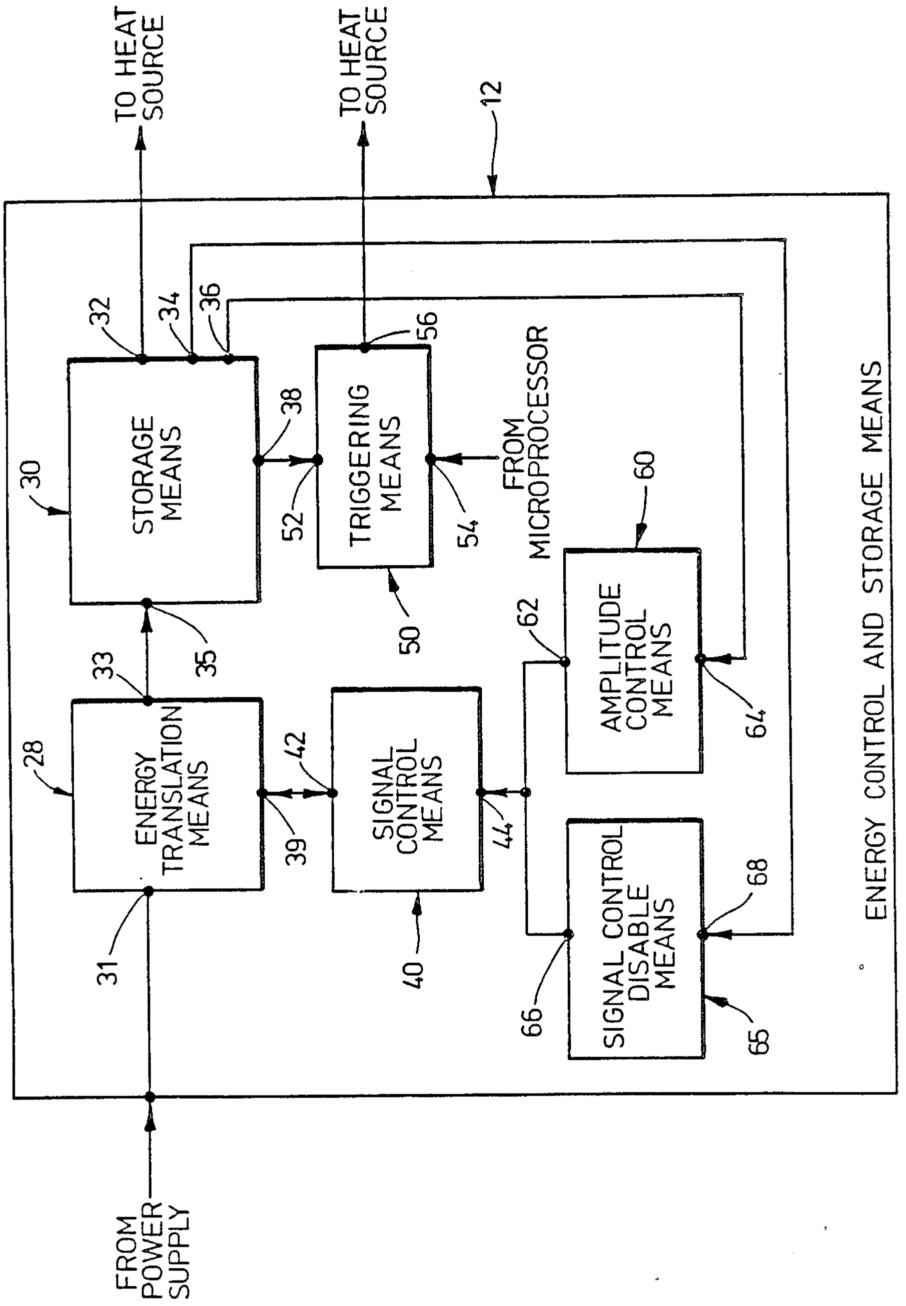
FIG. 2 is a more detailed block diagram of an element shown in block form in FIG. 1.

Referring now to FIG. 2, there is shown a detailed block diagram of the energy control and storage means represented by block 12 in FIG. 1. In particular, energy control and storage means 12 is preferably comprised of energy translation means 28 having an input 31 adapted to receive the 300 volt DC electrical output developed from power supply 10. This electrical output is passed via terminal 39 of energy translation means 28 to terminal 42 of signal control means 40. Signal control means 40 develops a ramp voltage which, upon exceeding a predetermined threshold, causes a train of voltage pulses to be generated and applied via terminal 33 of energy translation means 28 to terminal 35 of storage means 30. Storage means 30 includes a capacitor 122 (FIG. 3) which stores charge until a stored energy level of approximately 350 volts DC is established. When this occurs, a signal at output 36 of storage means 30 is passed to an input 64 of amplitude control means 60. Upon receipt of this signal at input 64, amplitude control means 60 develops a first cessation signal at its output 62. The first cessation signal is applied to an input 44 of signal control means 40 to stop the continuous generation of the train of voltage pulses heretofore passed to the capacitor (capacitor 122 in FIG. 3) in storage means 30, thus limiting the stored electrical energy across that capacitor to about 350 volts DC.

When a selected one of the containers 26, rotating in centrifuge 20, reaches position 25 (FIG. 1), a positioning signal is developed by the microprocessor and passed to an input 54 of triggering means 50. Upon receipt of this positioning signal, triggering means 50 develops a triggering signal at an output 56. This triggering signal is applied to the heat source which, in turn, converts the stored electrical energy into heat. This heat is, of course, applied to the container that is then in position 25, thereby heating the material held in that particular container.

When the heat source is converting the stored electrical energy into heat, a signal is developed at an output 34 of storage means 30 and applied to input 68 of signal control disable means 65. Signal control disable means 65 responds to this signal by developing a second cessation signal at its output 66. This second cessation signal is applied to input 44 of signal control means 40 to prevent generation of any further voltage pulses which may otherwise be developed and applied to storage means 30. In this way, substantially all the stored electrical energy is converted to heat within a time determined by the circuit parameters. This, of course, ensures that a substantially predetermined amount of heat will be applied to a container in position 25 during a substantially predetermined time duration. This time duration is short relative to the rate of rotation of the containers 26 mounted on centrifuge 20, whereby a burst of heat resulting from the conversion of 350 volts DC into heat by heat source 14 can be applied to any one or all of the containers 26 each time they reach position 25.

Figure 3:
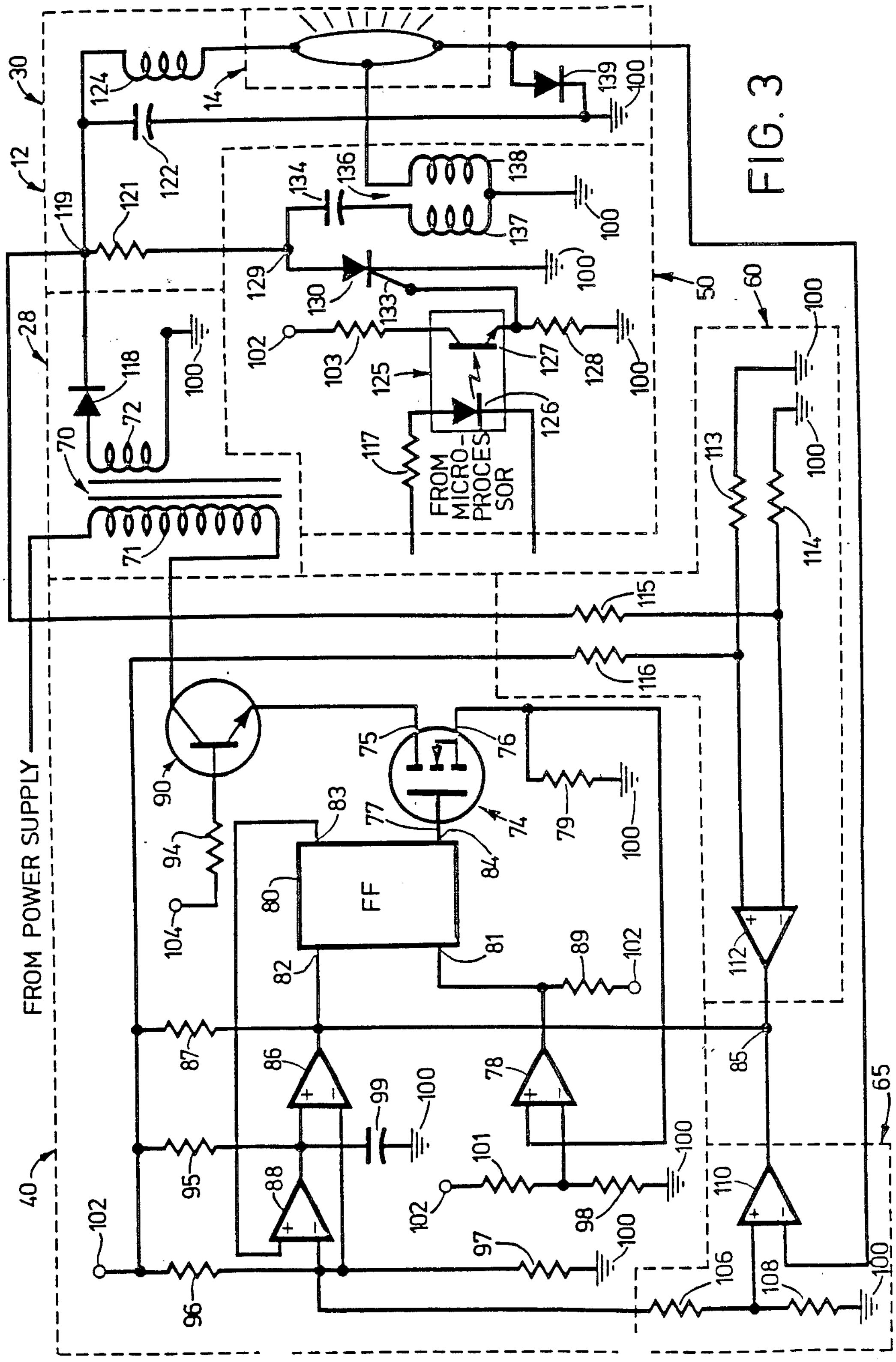
FIG. 3 is a simplified circuit diagram representing portions of the elements of the invention shown in block form in FIG. 2.

An explanation of simplified circuitry for carrying out the foregoing functions can now be described by referring to FIG. 3. This circuitry includes energy translation means 28 characterized by a transformer 70 having a primary winding 71 and a secondary winding 72. One end of secondary winding 72 is coupled to a high voltage return 100 while the other end is coupled to a diode 118. The cathode of diode 118 is connected to a node 119 in storage means 30. Node 119 is coupled through a resistor 121 to triggering means 50, and to amplitude control means 60. Node 119 is also coupled through capacitor 122 to return 100, and to return 100 via the series combination of an inductor 124, heat source 14, and a diode 139.

The primary winding 71 of transformer 70 is coupled to signal control means 40. In particular, winding 71 is coupled via a normally conducting bipolar transistor 90 and a normally conducting field effect transistor 74 through resistor 79 to return 100. The positive terminal of a voltage comparator 78 is also coupled to return 100 through resistor 79 as shown. Comparator 78 has a negative terminal which is coupled to return 100 through a resistor 98 and through a resistor 101 to a reference potential 102 to create the reference potential on that terminal. Field effect transistor 74 has a source terminal 76 coupled through a resistor 79 to return 100, a drain terminal 75 coupled to the emitter of transistor 90 and a gate terminal 77 coupled to a bistable device referred to herein as flip-flop 80. The base of transistor 90 is coupled through a resistor 94 to a reference potential 104 to create that reference potential on the base.

Flip-flop 80 has a normally low output 83 and a normally high output 84, the latter being coupled to the gate terminal 77 of field effect transistor 74. Flip-flop 80 also has a reset terminal 81 coupled to the output of comparator 78 and a set terminal 82 coupled to the output of a voltage comparator 86. The outputs of comparators 78 and 86 are also connected to reference potential 102 through resistors 89 and 87, respectively. Comparator 86 has a positive terminal coupled to the output of a voltage comparator 88 and a negative terminal coupled via a resistor 97, to return 100. The positive terminal of comparator 88 is coupled to the normally low output 83 of flip-flop 80, while the negative terminal of comparator 88 is coupled to return 100 via resistor 97, to signal control disable means 65 and to reference potential 102 via a resistor 96. Reference potential 102 is also coupled to the output of comparator 88 via a resistor 95, the output of comparator 88 also being coupled via a capacitor 99 to return 100.

Signal control disable means 65 includes a voltage comparator 110 having a positive terminal coupled via a resistor 108 to return 100, and also coupled via a resistor 106 to signal control means 40. The negative terminal of comparator 110 is connected to storage means 30 at the anode of diode 139. The normally high output of comparator 110 is coupled to amplitude control means 60 via a node 85.

Amplitude control means 60 includes a voltage comparator 112 having a positive terminal coupled to return 100 via a resistor 113 and a negative terminal coupled to return 100 via a resistor 114. The negative terminal of comparator 112 is also connected to the capacitor 122 of storage means 30 via a resistor 115 and node 119, and the positive terminal of comparator 112 is also connected to reference potential 102 via a resistor 116 to create the reference voltage on that terminal. The normally high output of comparator 112 is connected to node 85 which is, in turn, coupled to the set terminal 82 of flip-flop 80 in signal control means 40.

Voltage triggering means 50 includes a circuit for isolating the microprocessor 16 (FIG. 1) from the triggering means, which circuit may conveniently comprise an opto-isolator circuit 125 having a LED 126 and a phototransistor 127. The collector of phototransistor 127 is connected to reference voltage 102 through resistor 103 to create the reference voltage on the collector, while the emitter of the phototransistor is coupled both to return 100 through resistor 128 and to the gate 133 of a silicon controlled rectifier 130. The cathode of rectifier 130 is also coupled to return 100 and the anode is connected to a node 129. Node 129 is coupled through a capacitor 134 to one end of a primary winding 137 of a transformer 136. A secondary winding 138 of transformer 136 has one end coupled to heat source 14 for passing the triggering signal thereto. The other ends of windings 137 and 138 are connected to return 100.

In this preferred embodiment heat source 14 is a xenon flash tube which converts electrical energy applied thereto into radiant energy, i.e., heat, when the xenon gas inside the tube is ionized. Such ionization occurs upon the application of the triggering signal from triggering means 50 to heat source 14. When the gas is ionized in this manner, the electrical energy stored by capacitor 122 of storage means 30 is converted to heat. Thus, heat will not be produced by the flash tube unless the triggering signal has been developed.

In operation, the electrical output from power supply 10 is applied to transformer 70. Energy is built up in the primary winding 71 of transformer 70, and because both transistor 90 and field effect transistor 74 are normally conducting, a ramp voltage is developed and applied to the positive terminal of comparator 78. Comparator 78 compares this ramp voltage with reference voltage 102 applied at its negative terminal. When the ramp voltage equals this reference voltage, the normally low output of comparator 78 becomes high, thereby resetting flip-flop 80.

When flip-flop 80 is reset, output 84 changes state from high to low. This, in turn, causes field effect transistor 74 to change from its conductive state to its non-conductive state, providing an open circuit between primary winding 71 of transformer 70 and current source resistor 79. When this occurs, the energy stored in primary winding 71 is passed to secondary winding 72, causing a voltage pulse to be passed via diode 118 to capacitor 122. Capacitor 122 stores the charge associated with this voltage pulse.

The resetting of flip-flop 80 causes the normally low output at terminal 83 to become high. This high output is fed back to the positive terminal of comparator 88, causing its low output to become high also. When the output at comparator 88 becomes high, a signal is applied to the positive terminal of comparator 86 over a predetermined period of time established by the circuit parameters, particularly resistor 95 and capacitor 99. When this signal is applied to the positive terminal of comparator 86, a signal is applied to set terminal 82 of flip-flop 80, causing the flip-flop to return to its original state, i.e., causing terminal 83 to become low and terminal 84 to become high. When this occurs, field effect transistor 94 returns to its conducting state, thereby re-establishing a current path between primary winding 71 and the current source resistor 79. When this current path is re-established, another ramp voltage will be developed across resistor 79, causing another voltage pulse to be generated and ultimately passed to capacitor 122. In this manner a train of voltage pulses is generated and passed to capacitor 122, whereby capacitor 122 stores increasing quantities of charge, sometimes referred to herein as stored electrical energy. Though this stored electrical energy is impressed on the heat source 14 (via terminal 32 in FIG. 2), the flash tube will not convert it into radiant energy, i.e. heat, until the gas therein becomes ionized.

The gas in the flash tube of heat source 14 becomes ionized when a triggering signal is applied to the flash tube via transformer 136 in triggering means 50. Such triggering signal requires the application of a positioning signal from the microprocessor, indicating that a selected container has been moved into a position facing heat source 14. When the positioning signal is developed by the microprocessor, it is passed to optoisolator 125 of triggering means 50 via resistor 117, which is rendered conductive, causing a signal to be applied to the gate 133 of silicon controlled rectifier 130. The application of this signal at gate 133 causes the silicon controlled rectifier to conduct, thereby passing a signal to transformer 136. Transformer 136, upon receipt of this signal, develops the triggering signal which is applied to the flash tube. Upon receipt of this triggering signal, the flash tube converts the stored electrical energy associated with the charge on capacitor 122 into heat, thereby heating the selected container that is properly positioned relative to heat source 14.

Amplitude control means 60 controls the value of the stored energy, and thereby controls the amount of radiant energy, and hence the amount of heat, that will be produced by the flash tube. This is accomplished by instantaneously comparing the voltage associated with capacitor 122 with a predetermined voltage, preferably 350 volts DC. More particularly, at any given time the voltage associated with the charge stored by capacitor 122 is applied via node 119 and resistor 115 to the negative terminal of comparator 112, while the predetermined voltage is being applied to the positive terminal of that comparator. When the voltage equals the predetermined voltage, the normally high output of compartaor 112 becomes low, thereby preventing the flip-flop 80 from becoming set. This prevents terminal 84 of flip-flop 80 from returning to its normally high state, thereby preventing field effect transistor 74, from conducting. This, of course, prevents any further voltage pulses from being generated, thereby preventing any further charage from being built up on capacitor 122. Accordingly, the stored energy will never exceed a predetermined value, thus ensuring that a substantially predetermined amount of heat will be generated by the flash tube each time it is operated.

In a similar manner, signal control disable means 65 prevents further charge from being built up on capacitor 122 during the operation of the flash tube. In particular, when the flash tube is operating, a forward voltage, typically on the order of 0.7 volts DC, appears across diode 139 of storage means 130. This voltage is applied to the negative terminal of comparator 110. When this occurs, the normally high output at comparator 110 becomes low, thereby impressing a low voltage at set terminal 82 of flip-flop 80. As previously explained, this prevents flip-flop 80 from becoming set, thereby preventing the generation of any voltage pulses which may otherwise be applied to capacitor 122.

What has been described is a novel circuit for operating a flash tube under conditions which are particularly useful in providing accurate and reproducible parameters for analyzing biological material. Though the circuitry disclosed herein is preferred, other embodiments, variations or changes which do not part from the true scope of the invention will be apparent to those skilled in the art. Accordingly, all such embodiments, variations and changes are intended to be covered by the appended claims.

We claim:

1. An apparatus, adapted for analyzing samples of biological material, having a rotatable surface adapted to carry a plurality of said samples about the periphery, comprising:

a heat source located adjacent said rotatable surface adapted to convert electrical energy into heat upon receipt there;

an electrical power supply for producing an electrical output;

electrical storage means, coupled between said heat source and said power supply, adapted to convert said electrical output into stored electrical energy for subsequent application to said heat source, the electrical storage means producing a storage capacity signal representative of the amount of electrical energy stored in said electrical means;

signal control means adapted to receive the storage capacity signal and to produce a control signal to control the application of said electrical output to said electrical storage means;

amplitude control means for regulating the control signal to determine the amount of electrical energy stored in the electrical storage means;

signal means adapted to cause said stored energy to be applied to said heat source when at least one of said samples is rotated into proximity with said heat source, so that said heat source converts said stored electrical energy into heat and applies said heat to said one sample, said signal means causing said one sample to be heated again upon further rotation of said surface; and signal control disable means for preventing the further application of said electrical output to said electrical storage means when said stored electrical energy is applied to said heat source.

2. An apparatus, adapted for heating samples of biological material to be analyzed, having a rotatable surface comprising:

a plurality of mounting means, spaced about the periphery of said rotatable surface, each adapted to carry a sample of biological material which may be at a different temperture;

a heat source located adjacent said rotatable surface adapted to convert electrical energy into heat;

an electrical power supply for producing an electrical output;

electrical storage means, coupled between said heat source and said power supply, adapted to convert said electrical output into stored electrical energy for subsequent application to said heat source, the electrical storage means producing a storage capacity signal representative of the amount of electrical energy stored in said electrical storage means;

signal control means adapted to receive the storage capacity signal and to produce a control signal to control the application of said electrical output to said electrical storage means;

amplitude control means for regulating the control signal to determine the amount of electrical energy stored in the electrical storage means;

means adapted to develop a positioning signal when a selected sample of said biological material is moved into proximity of said heat source;

triggering means, coupled to said heat source, adapted to cause said stored energy to applied to said heat source upon generation of said positioning signal so that said heat source converts said stored elecrical energy into heat and applied said heat to said selected sample of said biological material as said sample is moved past said heat source so that each sample may be raised to a respective temperature; and signal control disable means for preventing the further application of said electrical output to said electrical storage means when said stored electrical energy is applied to said heat source.

3. The apparatus defined in claim 2 wherein said heat source is a flash tube containing an ionizable gas, and wherein said heat source generates a quantity of heat corresponding to the electrical energy applied thereto when said gas in said tube in ionized.

4. The apparatus defined in claim 3 wherein said flash tube is adapted to generate said heat only when said material to be analyzed is moved adjacent to said tube.

5. The apparatus defined in claim 4 wherein said storage means includes a capacitor coupled to said flash tube, said capacitor being adapted to apply said stored electrical energy to said tube causing said tube to generate said heat when said gas is ionized.

6. The apparatus defined in claim 5 wherein said triggering means includes a transformer, coupled to said flash tube, adapted to apply a triggering signal thereto for the purpose of ionizing said gas therein.

7. The apparatus defined in claim 5 further includes energy translation means coupled between said electrical power supply and said storage means, the energy translation means cooperating with the storage means and signal control means to convert said output applied from said power supply into a train of voltage pulses which are applied to said capacitor in said storage means, thereby charging said capacitor.

8. The apparatus defined in claim 7 wherein said amplitude control means is coupled to said signal control means and to said storage means, said amplitude control means producing a first cessation signal to stop the generation of said train of voltage pulses when said stored electrical energy substantially equals a predetermined value.

9. The apparatus defined in claim 8 wherein said signal control disable means is coupled to said signal control means to said storage means, said signal control disable means producing a second cessation signal to stop the generation of said train of pulses when the gas in said tube is ionized.

10. The apparatus defined in claim 9 wherein said energy translation means includes a transformer having a primary winding coupled to said signal control means and a secondary winding coupled to said capacitor in said storage means, said primary winding receiving said output from said power supply and causing development of a ramp signal, and said signal control means having comparison means for comparing said ramp signal with a predetermined signal; said signal control means further causing the energy in said primary winding to be transferred to said secondary winding to produce a voltage pulse when the magnitude of said ramp signal substantially equals that of said predetermined signal.

11. The apparatus defined in claim 10 wherein said signal control means further include a normally closed electronic switch disposed between said primary winding and said comparison means, and bistable means disposed between said comparison means and said switch; said bistable means causing the opening of said switch to prevent said ramp signal from being applied to said comparison means for a predetermined time after the generation of a voltage pulse by said transformer.

12. The apparatus defined in claim 11 wherein said signal control means further include a capacitor coupled to said bistable means to prevent said bistable means from reclosing said switch until after a predetermined time has elapsed.

13. The apparatus defined in claim 12 wherein said electronic switch is a field effect transistor.

14. A method for applying heat at predetermined times to selected samples of biological material under analysis comprising the steps of:

locating samples of said biological material, which may be at different temperatures, about the periphery of a centrifuge;

mounting a flash tube adjacent the periphery of said centrifuge;

storing, in electrical storage means, a charge applicable to said flash tube cauing the release therefrom of heat upon application of a triggering signal to said flash tube;

generating a storage capacity signal representative of the amount of charge stored in said electrical storage means;

regulating the storing of the charge to determine the amount of heat to be released from said flash tube;

developing a positioning signal when a selected sample of said material is rotated on said centrifuge to a position adjacent said flash tube;

applying a triggering signal to said flash tube upon development of said positioning signal, whereupon said flash tube applies an amount of heat to said sample of material corresponding to the charge stored in said storage means, thereby raising the temperature of said sample of material;

preventing the further storing of charge in said electrical storage means during the application of heat to said sample of material by said flash tube.

15. The method defined in claim 14 further includes the step of generating a train of voltage pulses and applying said train to said storage means to develop said charge.

16. The method defined in claim 15 wherein said voltage pulses are generated until the charge stored at said storage means substantially attains a predetermined value.

17. The method defined in claim 16 wherein the application of said triggering signal to said flash tube causes gas in said flash tube to become ionized.

18. The method defined in claim 17 further includes the step of stopping the generation of said train of voltage pulses when the gas in said flash tube is ionized.

* * * * *